United States Patent [19]
Jacox et al.

[11] Patent Number: 5,299,242
[45] Date of Patent: Mar. 29, 1994

[54] DUAL ANNULAR ROTATING "WINDOWED" NUCLEAR REFLECTOR REACTOR CONTROL SYSTEM

[75] Inventors: Michael G. Jacox; Robert L. Drexler; Robert N. M. Hunt; James A. Lake, all of Idaho Falls, Id.

[73] Assignee: The United States of America as represented by the United States Department of Energy, Washington, D.C.

[21] Appl. No.: 967,504

[22] Filed: Oct. 28, 1992

[51] Int. Cl.⁵ .............................................. G21C 7/06
[52] U.S. Cl. ..................................... 376/223; 376/318
[58] Field of Search ............... 376/318, 317, 909, 910, 376/223

[56] References Cited
U.S. PATENT DOCUMENTS 4,106,984  8/1978  Schneider ........................... 376/318
5,106,574  4/1992  El-Genk et al. ..................... 376/909

Primary Examiner—Donald P. Walsh
Attorney, Agent, or Firm—Mark P. Dvorscak; Robert J. Fisher; William R. Moser

[57] ABSTRACT

A nuclear reactor control system is provided in a nuclear reactor having a core operating in the fast neutron energy spectrum where criticality control is achieved by neutron leakage. The control system includes dual annular, rotatable reflector rings. There are two reflector rings: an inner reflector ring and an outer reflector ring. The reflectors are concentrically assembled, surround the reactor core, and each reflector ring includes a plurality of openings. The openings in each ring are capable of being aligned or non-aligned with each other. Independent driving means for each of the annular reflector rings is provided so that reactor criticality can be initiated and controlled by rotation of either reflector ring such that the extent of alignment of the openings in each ring controls the reflection of neutrons from the core.

4 Claims, 3 Drawing Sheets

OPERATING CONDITION

SHUTDOWN CONDITION

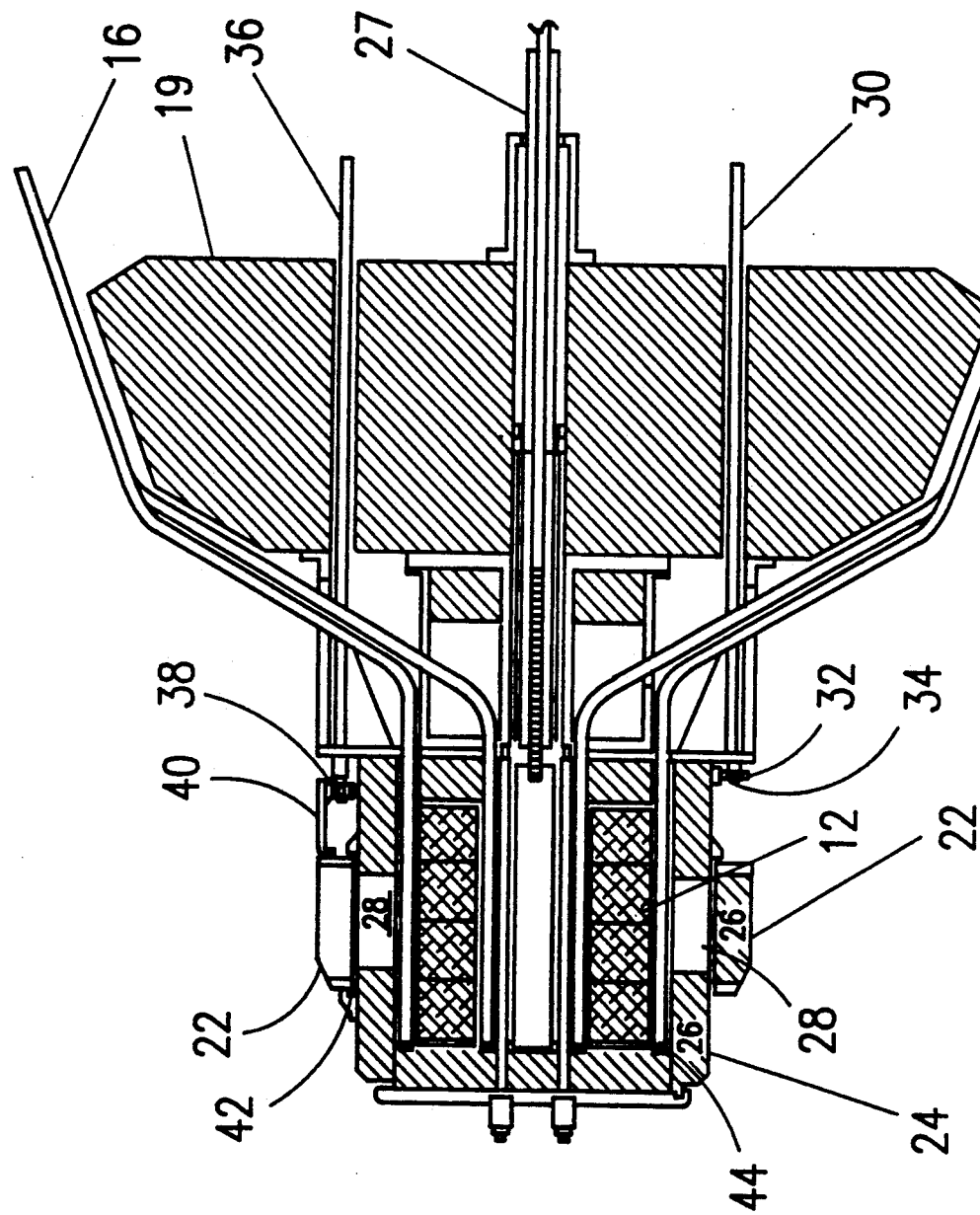

DUAL ANNULAR ROTATING "WINDOWED" NUCLEAR REFLECTOR REACTOR CONTROL SYSTEM

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

BACKGROUND OF THE INVENTION

This invention relates generally to a nuclear reactor control system and more particularly to a device for the control of a nuclear reactor in the form of two independently controlled, concentrically assembled, reflectors.

Interest in the use of nuclear power sources for U.S. space programs has recently increased. The use of nuclear power in space has importance because spacecraft destined for deep-space exploration cannot effectively utilize solar power as an energy source due to their distance from the sun. Additionally, some satellites and planetary space probes operating close to the sun have electrical power design requirements that cannot withstand cyclical solar exposures or rely on rechargeable batteries. Furthermore, as the electrical power requirements for spacecraft increase, the capability of solar power to supply the electricity becomes limited by the sheer size of solar panels. Therefore, a reliable, long term supply of energy is needed in a low-mass form that requires minimal space. Nuclear power can supply this energy need.

There are two types nuclear power sources used in space applications. One type, called radioisotope thermoelectric generators (RTGs), uses the decay of naturally radioactive elements to produce heat. The other type of nuclear power source uses nuclear reactors to produce heat. Space nuclear reactors employ several power conversion technologies. Among them are thermoelectrics and thermionics. In general, the thermoelectric nuclear reactor uses a circulating medium to transport heat from the reactor core to energy conversion devices located behind a radiation shield. In one reactor, the SP-100, a liquid metal (Li) is used in a pumped loop to transport the core heat to the conversion devices. The thermionic nuclear reactor concepts generally perform the energy conversion in the core and transport the waste heat via heat pipes or liquid metal loops.

To achieve a maximum level of system reliability and redundancy in conventional reflector control systems employed in test reactors, like the Advanced Test Reactor (ATR) at the Idaho National Engineering Laboratory (INEL), or the SNAP and SP-100 space reactors, multiple and independently operated and controlled reflector elements are required. In the ATR, SNAP, and the Russian TOPAZ reactors, reflector drums are utilized around the perimeter of the core. In the SP-100 reactor, hinged "shutter" reflector segments are employed. In both of these systems, failure of one or more of the reflector drives or control systems may disable the reactor startup or shutdown, and at a minimum, will compromise full mission capability.

A new space nuclear power concept has been developed by the INEL. This concept, the Small Ex-core Heat Pipe Thermionic Reactor (SEHPTR), has unique features and significant advantages for both defense and civilian space missions. SEHPTR was developed to meet needs for space nuclear power in the range of 10 to 40 kilowatts. In addition, other requirements that space nuclear power systems must meet to be acceptable to potential users have been identified. These requirements include safety of the system during launch and operation, and the ability to perform rigorous ground testing. Performance requirements dictate a high reliability and emphasize reduced system volume and mass. Additionally, several spacecraft developers have indicated a reluctance to incorporate into their spacecraft any primary power subsystem that has potential mission ending single point failures.

It is therefore an object of the present invention to provide a reactor control device for a primary nuclear power subsystem which is subcritical in launch accident scenarios, and which eliminates credible mission ending single point failures.

A further object of the present invention is to provide a reactor control device in which either of two reflectors are capable of independently controlling the reactor to provide redundancy.

Yet another object of the present invention is to provide reliable reactor control for a space nuclear power system with a minimum of redundant hardware and minimum mass penalty.

SUMMARY OF THE INVENTION

This invention provides a nuclear reactor control system in a nuclear reactor having a core operating in the fast neutron energy spectrum where criticality control is achieved by neutron leakage. The control system includes dual annular, rotatable reflector rings. There are two reflector rings: an inner reflector ring and an outer reflector ring. The reflectors are concentrically assembled, surround the reactor core, and each reflector ring includes a plurality of openings. The openings in each ring are capable of being aligned or non-aligned with each other. Independent driving means for each of the annular reflector rings is provided so that reactor criticality can be initiated and controlled by rotation of either reflector ring in either direction such that the extent of alignment of the openings in each ring controls the reflection of neutrons from the core.

The openings in each reflector ring are of a size to ensure that when the openings in each reflector are not aligned, the reactor is operational due to the reflection of neutrons back to the reactor core where the neutrons initiate and sustain the fission process, and when the openings in each reflector are aligned, the reactor is shutdown due to insufficient reflection of neutrons into the reactor core to allow the reactor to attain criticality.

The means for independent driving of each reflector ring includes inner reflector drive means and outer reflector drive means. The inner reflector drive means and the outer reflector drive means each include a reflector drive shaft operably connected to a pinion and ring gear structurally connected to the inner or outer reflector, such that rotation of either drive shaft causes the pinion to turn its respective ring gear to thereby rotate the associated reflector to control neutron leakage from the reactor core.

BRIEF DESCRIPTION OF THE DRAWINGS

The above-mentioned and other features of the invention will become more apparent and be best understood, together with the description, by reference to the accompanying drawings, in which.

DETAILED DESCRIPTION OF THE INVENTION

Figure 1:
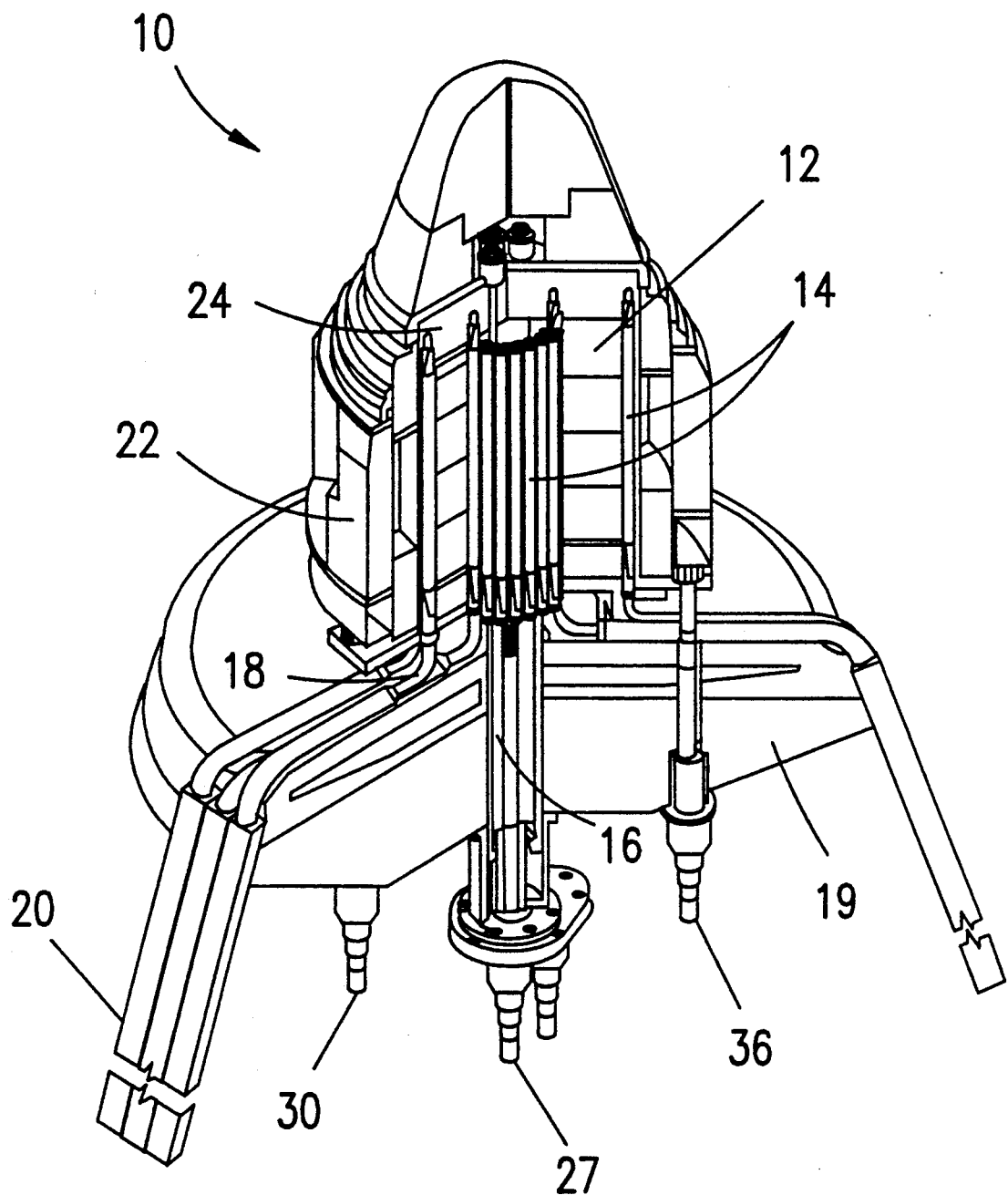
FIG. 1 shows a baseline Small Ex-core Heat Pipe Thermionic Reactor concept, in which a reactor has the control features of the present invention.

In response to the above needs for space nuclear power, the Small Excore Heat Pipe Thermionic Reactor (SEHPTR) concept was developed. The SEHPTR concept provides an innovative solution to these concerns of potential users of space nuclear power systems. FIG. 1 illustrates the baseline SEHPTR concept, in which a reactor 10 having the control features of the present invention is shown. Heat is generated within a solid annular core 12 at very high temperatures. The core 12 includes tapered hexagonal shaped fuel elements of $UO_2$ clad in tungsten. The fuel elements are packaged into four fuel bundles which comprise the core. The annular fuel bundles can be removed, allowing for the entire (non-nuclear) power system to be tested with an electrically heated core simulator. Both the inside and outside surfaces of the core radiate the heat to thermionic energy conversion devices 14 which are located around the core 12. The core heat is collected by high temperature annular emitter heat pipes (not shown) that isothermalize the emitter (inside heat pipe) surface both circumferentially and axially. The collector (cold side) is maintained at a constant temperature by molybdenum based sodium heat pipes 18 that run the length of the core and then bend around shield 19 and become an integral part of the radiator 20. In this particular embodiment of the concept, sixty two thermionic heat pipe units are employed to provide redundancy. There are no pumps or circulating core coolant loops associated with this design.

The reactor core is designed to operate in the fast neutron energy spectrum, and criticality control is achieved by neutron leakage. Neutrons are reflected back into the core 12 from the periphery by windowed reflectors 22 and 24. This innovation is the subject of the present application and will be explained more fully below. A central poison rod 16 and associated drive mechanism 27 provides a secondary shutdown device at launch and a backup shutdown mechanism after operation begins on orbit.

Figure 2A:
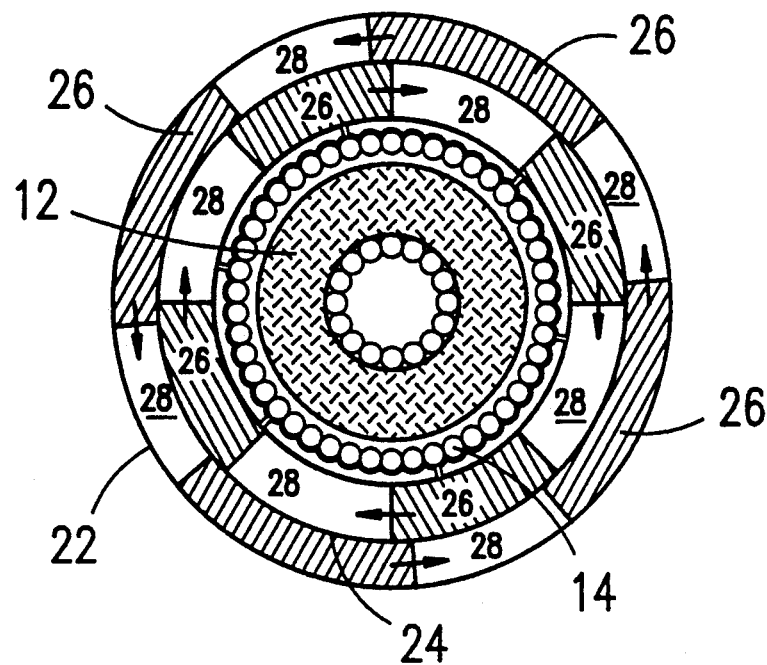
FIG. 2 shows a cross sectional view of a redundant windowed reactor control scheme in an operating condition (FIG. 2a) and in a shutdown condition (FIG. 2b); and, FIG. 3 shows a sectional view of the reactor control system and its drive mechanisms.
Figure 2B:
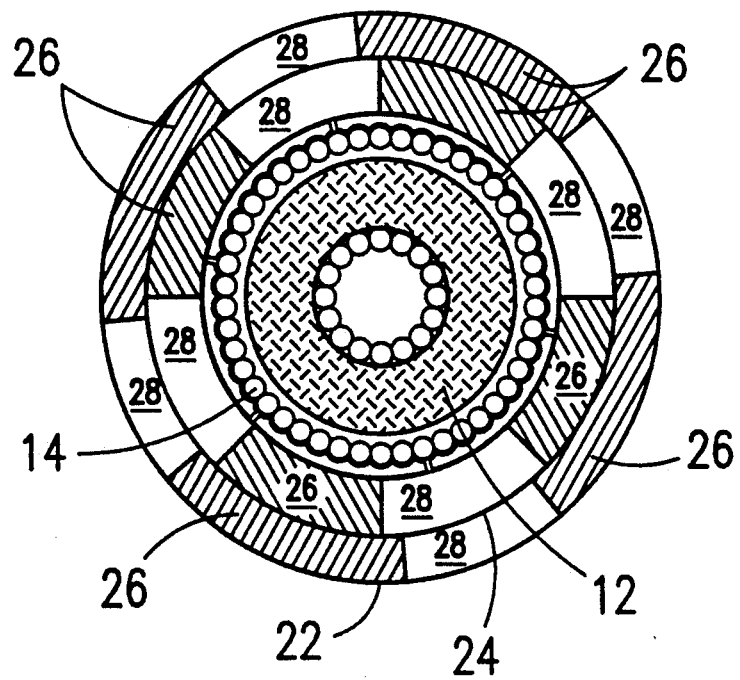

A cross section of the windowed reflector control scheme is depicted in FIG. 2. FIG. 2a shows the reflector control in an operating condition, and FIG. 2b shows the control in a shutdown condition. Movable annular reflector rings 22 and 24 are concentrically assembled and surround the core 12. Reflector 22 is the outer ring while reflector 24 is the inner ring, closest to the core 12. Each reflector ring includes a plurality of reflective portions 26 in an alternating relationship with a plurality of windowed portions 28 spaced around its circumference. The windowed portions 28 of the reflector rings may be simply voids or openings, or may be filled with a non-reflecting material. The core 12 is reflected around the periphery by the reflective portions 26 of the rings 22 and 24. It is preferred that the reflective portions 26 of the rings be BeO. The dual annular reflective rings 22 and 24 control the reactor by rotational movement relative to each other about the core 12.

More specifically, reactor control is achieved by allowing neutrons to leak or be reflected by this dual rotating "windowed" reflector. The reactor 10 is shutdown when the inside and outside windowed portions 28 in the reflector rings 22 and 24 are aligned, as shown in FIG. 2b. The openings in each reflector ring are of a size to ensure that when the openings in each reflector are coincident, there is insufficient reflection of neutrons back to the reactor to allow the reactor to attain criticality. The reactor 10 becomes operational as the windowed portions 28 become non-aligned or closed, thus reflecting neutrons back into the core region, as seen in FIG. 2a.

The redundant reflector control scheme of the present invention requires that independent drives turn either the inner or outer reflector ring segments in either direction (clockwise or counterclockwise). Referring to FIG. 3, a sectional view of the reactor control and its drive mechanisms is shown. Inner reflector drive shaft 30 is operably connected to inner pinion 32, which turns inner reflector ring gear 34. The ring gear 34 is structurally connected to the annular windowed inner reflector 24. A similar configuration is used for the outer reflector 22. Outer reflector drive shaft 36 is operably connected to outer pinion 38, which turns outer reflector ring gear 40. The ring gear 40 is structurally connected to the annular windowed outer reflector 22. Inner drive shaft 30 and outer drive shaft 36 are each driven by an individual drive motor (not shown). An annular space 42 between the reflectors 22 and 24, and an annular space 44 between the inner reflector 24 and the core 12 minimizes frictional resistance to rotational movement. A torsional spring or other stored energy device may be provided to interconnect the reflector rings 22 and 24. This torsional spring could be used to automatically return each or either reflector to a system unreflected state (i.e. reflector windows 28 aligned one to the other) upon a loss of power to the control drive motors. Fail safe shut down operation of the reactor would thus be achieved with the torsional spring. With the described arrangement, either the inside 24 or outside 22 reflector and its associated drive 30 or 36, respectively, is capable of independently controlling the reactor and providing redundancy. The simplicity of the drive system, the minimum number of moving parts, and the minimal driving distances and torques resulting from the limited rotation needed to form a complete uninterrupted reflector around the core ensures both minimum weight and maximum reliability for the system.

To initiate reactor criticality, each reflector is operated independently and rotated in either direction to an extent that the openings in each are no longer aligned. This reduces the leakage of neutrons from the reactor and the reflector functions to reflect the neutrons back to the reactor core where they are used to initiate and sustain the fission process. Only one of the two reflectors need be moved to achieve reflection of the core. The ability to initiate or sustain a critical configuration by movement of either of the reactor reflectors means that two independent means of controlling the reactor reflector are provided, thus greatly enhancing the reliability of the reactor control system.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed is defined as follows:

1. In a nuclear reactor having a core operating in the fast neutron energy spectrum where criticality control is achieved by neutron leakage, a reactor control system comprising:
   a) dual annular, rotatable reflector rings, the rings including an inner reflector ring and an outer reflector ring, the reflectors concentrically assembled, surrounding the reactor core, and each reflector ring including a plurality of openings, the openings in each ring capable of alignment with each other;
   b) means for independent driving of each of the annular reflector rings such that reactor criticality can be initiated and controlled by rotation of either reflector ring such that the extent of alignment of the openings in each ring controls the reflection of neutrons from the core.

2. The reactor control system of claim 1 wherein the openings in each reflector ring are of a size to ensure that when the openings in each reflector are not aligned, the reactor is operational due to the reflection of neutrons back to the reactor core where the neutrons initiate and sustain the fission process, and when the openings in each reflector are aligned, the reactor is shutdown due to insufficient reflection of neutrons to the reactor core to allow the reactor to attain criticality.

3. The reflector ring of claim 2 wherein the means for independent driving of each reflector ring includes inner reflector drive means and outer reflector drive means.

4. The reflector ring of claim 3 wherein the inner reflector drive means and the outer reflector drive means each include a reflector drive shaft operably connected to a pinion and ring gear structurally connected to the inner or outer reflector, such that rotation of either drive shaft causes the pinion to turn its respective ring gear to thereby rotate the associated reflector to control neutron leakage from the reactor core.

* * * * *